United States Patent [19]

Shiflett et al.

[11] Patent Number: 5,766,503
[45] Date of Patent: Jun. 16, 1998

[54] REFRIGERATION PROCESS USING AZEOTROPIC COMPOSITIONS OF PERFLUOROETHANE AND TRIFLUOROMETHANE

[75] Inventors: Mark Brandon Shiflett, Newark; Akimichi Yokozeki, Wilmington, both of Del.; Barbara Haviland Minor, Elkton, Md.

[73] Assignee: E. I. du Pont de Nemours and Company, Wilmington, Del.

[21] Appl. No.: 646,834

[22] Filed: May 8, 1996

Related U.S. Application Data

[63] Continuation of Ser. No. 356,995, Dec. 16, 1994, abandoned.

[51] Int. Cl.$^6$ ............................................. C09K 5/04
[52] U.S. Cl. ............................................. 252/67; 62/114
[58] Field of Search ........................... 252/67, DIG. 9; 62/114

[56] References Cited

U.S. PATENT DOCUMENTS

| | | | |
|---|---|---|---|
| 3,770,640 | 11/1973 | Bartlett | 252/68 |
| 4,071,461 | 1/1978 | Mear et al. | 252/63.5 |
| 4,170,564 | 10/1979 | Brendle | 252/68 |
| 4,369,120 | 1/1983 | Stelz et al. | 252/68 |
| 4,376,672 | 3/1983 | Wang et al. | 156/643 |
| 4,436,641 | 3/1984 | Stelz et al. | 252/68 |
| 4,622,825 | 11/1986 | Larue et al. | 62/102 |
| 4,758,366 | 7/1988 | Parekh | 252/68 |
| 5,149,453 | 9/1992 | Parekh | 252/68 |
| 5,340,490 | 8/1994 | Decaire et al. | 252/67 |
| 5,351,499 | 10/1994 | Takemasa | 62/114 |

FOREIGN PATENT DOCUMENTS

| | | |
|---|---|---|
| 174027 | 3/1986 | European Pat. Off. |
| 82006405 | 2/1982 | Japan |
| 3075449 | 3/1991 | Japan |
| 4288451 | 10/1992 | Japan |
| 5-186765 | 7/1993 | Japan |

| | | |
|---|---|---|
| WO 9307232 | 4/1993 | WIPO |
| 93/21280 | 10/1993 | WIPO |
| 94/01512 | 1/1994 | WIPO |

OTHER PUBLICATIONS

Chemical Abstract No. 114: 129653s Abstract of Gunchuk et al, Teplofiz. Svoistva Veshchestv i Mater., Moskua, 1989 No Month Available vol. 28 pp. 93–106.

*Hackh's Chemical Dictionary*, Third. Ed., McGraw–Hill Book Co., Inc., N.Y., p. 90, 1944.

International Preliminary Search Report, International Filing Date Jun. 28, 1993, International Application No. PCT/US93/05995.

Hadley et al., The Action of Elementary Fluorine Upon Organic Compounds. IX. The Vapor Phase Fluorination of Methane. *Journal of the American Chemical Society*, 62, 3302–3303, 1940.

Proceedings of the XVIIIth International Congress of Refrigeration Montreal, Quebec, Canada, vol. II, Aug. 10–17, 1991, pp. 626–629.

Thorp and Scott, *Fluorocarbon Solutions at Low Temperatures, II. The Liquid Mixtures $C_2H_6$–$C_2F_6$, $C_2F_6$–$CHF_3$, $CH_2F_2$–$CHF_3$, $C_2H_6$–$CHF_3$ and $Xe$–$CHF_3$* Thes. Journal (Jun. 4, 1956).

*Primary Examiner*—Douglas J. McGinty

[57] ABSTRACT

Compositions of perfluoroethane and trifluoromethane are disclosed as acceptable drop in replacements for R-503.

Also disclosed are azeotropic or azeotrope-like compositions of admixtures of effective amounts of perfluoroethane and trifluoromethane, nitrous oxide, carbon dioxide, or fluoromethane to form an azeotropic or azeotrope-like composition.

Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

3 Claims, No Drawings

REFRIGERATION PROCESS USING AZEOTROPIC COMPOSITIONS OF PERFLUOROETHANE AND TRIFLUOROMETHANE

This is a continuation of application Ser. No. 08/356,995 filed Dec. 16, 1994, now abandoned.

FIELD OF THE INVENTION

This invention relates to compositions, or mixtures, of fluorinated hydrocarbons and more specifically to azeotropic or azeotrope-like compositions comprising effective amounts of perfluoroethane and trifluoromethane, nitrous oxide, carbon dioxide, or fluoromethane to form an azeotropic or azeotrope-like composition. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. In refrigeration applications, a refrigerant is often lost during operation through leaks in shaft seals, hose connections, solder joints, and broken lines. In addition, the refrigerant may be released to the atmosphere during maintenance procedures on refrigeration equipment.

Accordingly, it is desirable to use a single fluorinated hydrocarbon or an azeotropic or azeotrope-like composition that includes one or more fluorinated hydrocarbons as a refrigerant. Some nonazeotropic compositions that include one or more fluorinated hydrocarbons may also be used as refrigerants, but they have the disadvantage of changing composition, or fractionating, when a portion of the refrigerant charge is leaked or discharged to the atmosphere. If a non-azeotropic composition contains a flammable component, the blend could become flammable because of such a change in composition. Refrigerant equipment operation could also be adversely affected due to the change in composition and vapor pressure that results from fractionation.

Fluorinated hydrocarbons may also be used as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning.

Azeotropic or azeotrope-like compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinate hydrocarbons and azeotropic or azeotrope-like compositions of fluorinated hydrocarbons as propellant vapor pressure attenuators in aerosol systems.

Azeotropic mixtures, with their constant compositions and vapor pressures are useful as solvents and propellants in aerosols.

Azeotropic or azeotrope-like compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Azeotropic or azeotrope-like compositions that include fluorinated hydrocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

Some of the fluorinated hydrocarbons that are currently used in these applications have been theoretically linked to depletion of the earth's ozone layer. What is needed, therefore, are substitutes for fluorinated hydrocarbons that have low ozone depletion potentials.

SUMMARY OF THE INVENTION

The present invention relates to the discovery that a mixture of perfluoroethane and trifluoromethane is a drop-in replacement refrigerant for R503, which is a mixture of trifluoromethane and chlorotrifluoromethane. The invention also relates to the discovery of azeotropic or azeotrope-like compositions comprising effective amounts of perfluoroethane and trifluoromethane, nitrous oxide, carbon dioxide, or fluoromethane to form an azeotropic or azeotrope-like composition.

DETAILED DESCRIPTION

R-503 is a mixture of trifluoromethane (R-23) and chlorotrifluoromethane (R-13). R-13 contains chlorine which has been theoretically linked to depletion of the Earth's ozone layer, and therefore it is desirable to find a replacement for R-503 that is chlorine-free. It has been discovered that certain mixtures of perfluoroethane (R-116) and R-23 can be used as a drop in replacement refrigerant for R-503. Specifically, as shown below, such mixtures include a mixture of 54 weight percent R-116 and 46 weight percent R-23.

The azeotropic or azeotrope-like compositions, or mixtures, of the present invention comprise effective amounts of perfluoroethane (FC-116, or $CF_3-CF_3$, boiling point=−78.3° C.) and trifluoromethane (HFC-23, or $CHF_3$, boiling point=−82.1° C.), nitrous oxide ($N_2O$, boiling point=−88.5° C.), carbon dioxide ($CO_2$, boiling point=−78.5° C.), or fluoromethane (HFC-41, or $CH_3F$, boiling point=−78.4°

C.) to form substantially constant boiling, azeotropic or azeotrope-like compositions.

Effective amounts of perfluoroethane and trifluoromethane, nitrous oxide, carbon dioxide, or fluoromethane to form an azeotropic or azeotrope-like composition, when defined in terms of weight percent of the components at a specific pressure or temperature, include the following.

Substantially constant-boiling, azeotropic or azeotrope-like compositions of perfluoroethane and trifluoromethane comprise about 40 to 65 weight percent perfluoroethane and 35 to 60 weight percent trifluoromethane at 100 psia (689.5 kPa). These compositions boil at about −46.4 +/−0.5° C. A preferred composition of the invention is the azeotrope which comprises about 53.8 weight percent perfluoroethane and about 46.2 weight percent trifluoromethane and which boils at −46.5° C. at 100 psia, and which comprises about 55.9 weight percent perfluoroethane and about 44.1 weight percent trifluoromethane and which boils at −63.55° C. at 49.316 psia.

Substantially constant boiling, azeotropic or azeotrope-like compositions of perfluoroethane and nitrous oxide comprise about 35 to 55 weight percent perfluoroethane and about 45 to 65 percent nitrous oxide at 100 psia. These compositions boil at about −51.1 +/−0.5° C. A preferred composition of the invention is the azeotrope which comprises about 45.3 weight percent perfluoroethane and about 54.7 weight percent nitrous oxide and which boils at −51.2° C. at 100 psia, and which comprises about 44.8 weight percent perfluoroethane and about 55.2 weight percent nitrous oxide and which boils at −45.55° C. at 123.3 psia.

Substantially constant boiling, azeotrope or azeotrope-like compositions of perfluoroethane and carbon dioxide comprise about 45 to 60 weight percent perfluoroethane and about 40 to 55 weight percent carbon dioxide at 100 psia. These compositions boil at about −52.2 +/−0.5° C. A preferred composition of the invention is the azeotrope which comprises about 51.4 weight percent perfluoroethane and about 48.6 weight percent carbon dioxide and which boils at 52.2° C. at 100 psia, and which comprises about 47.9 weight percent perfluoroethane and about 52.1 weight percent carbon dioxide and which boils at −45.55° C. at 138.1 psia.

Substantially constant boiling, azeotrope or azeotrope-like compositions of perfluoroethane and fluoromethane comprise about 78 to 82 weight percent perfluoroethane and 18 to 22 weight percent fluoromethane at 100 psia. These compositions boil at about −47.7 +/−0.5° C. A preferred composition of the invention is the azeotrope which comprises about 80.3 weight percent perfluoroethane and 19.7 weight percent fluoromethane and which boils at −47.6° C. at 100 psia, and which comprises about 80.2 weight percent perfluoroethane and 19.8 weight percent fluoromethane and which boils at −45.55° C. at 108.2 psia.

Effective amounts of perfluoroethane and trifluoromethane, nitrous oxide, carbon dioxide, or fluoromethane to form an azeotropic or azeotrope-like composition can also be defined as including amounts of these components such that the difference in dew point temperature and bubble point temperature of the composition is less than or equal to 1° C. It is recognized in the art that a small difference, such as 1° C., between the dew point temperature and the bubble point temperature of a composition at a particular pressure is an indication that the composition is azeotropic or azeotrope-like. It has been found unexpectedly that compositions some distance away from the true azeotropes of FC-116 and HFC-23, or FC-116 and N$_2$O, or FC-116 and CO$_2$, or FC-116 and HFC-41 have differences in dew point and bubble point temperature of less than or equal to about 1° C.

Therefore, included in this invention are compositions of effective amounts of FC-116 and HFC-23 or compositions of effective amounts of FC-116 and N$_2$O, or compositions of effective amounts of FC-116 and CO$_2$, or compositions of effective amounts of FC-116 and HFC-41, such that the compositions have a difference in dew point temperature and bubble point temperature of less than or equal to 1° C. Such compositions include binary compositions of about 40 to 65 weight percent FC-116 and about 35 to 60 weight percent HFC-23; binary compositions of about 35 to 55 weight percent FC-116 and about 45 to 65 weight percent N$_2$O; binary compositions of about 45 to 60 weight percent FC-116 and about 40 to 55 weight percent CO$_2$; and binary compositions of about 78 to 82 weight percent FC-116 and about 18 to 22 weight percent HFC-41, all at 100 psia.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at pressures other than the pressure described herein.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D. . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, and azeotrope of A, B, C (and D. . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D. . . ), while recognizing that such specific values point out only one particular relationship and that in actuality, a series of such relationships, represented by A, B, C (and D. . . ) actually exist for a given azeotrope, varied by the influence of pressure.

An azeotrope of A, B, C (and D. . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

FC-116 AND HFC-23

EXAMPLE 1

A phase study was made on perfluoroethane and trifluoromethane, wherein the composition was varied and the vapor pressures measured, at a constant temperature of −63.55° C. An azeotropic composition was obtained as evidenced by the maximum vapor pressure observed and was identified as follows:

Perfluoroethane=55.9 weight percent
Trifluoromethane=44.1 weight percent
Vapor pressure=49.316 psia (340.0 kPa) at −63.55° C.

EXAMPLE 2

Phase studies on perfluoroethane and trifluoromethane at other temperatures and pressures disclose the following azeotropic compositions:

Perfluoroethane=53.8 weight percent
Trifluoromethane=46.2 weight percent
Vapor pressure=100 psia at −46.5° C.
Perfluoroethane=41.1 weight percent
Trifluoroethane=58.9 weight percent
Vapor pressure=14.7 psia (101.3 kPa) at −86.9° C.

EXAMPLE 3

The novel azeotropic or azeotrope-like compositions of the present invention exhibit a higher vapor pressure than either of the two constituents and exhibit dew and bubble points with virtually no temperature differentials. As is well known in the art, a small difference between dew point and bubble point temperatures is an indication of the azeotrope-like behavior of compositions.

A study of dew point and bubble point temperatures for various compositions indicates that the differences in dew point and bubble point temperatures of the azeotrope-like compositions of the invention are very small with respect to the differences in dew point and bubble point temperatures of several known, nonazeotropic, binary compositions, namely, (50+50) weight percent compositions of pentafluoroethane (HFC-125) and 1,1,1,2-tetrafluoroethane (HFC134a), and (50+50) weight percent compositions of chlorodifluoromethane (HCFC22) and 1-chloro-1,1-difluoroethane (HCFC-142b). These data confirm the azeotrope-like behavior of the compositions of this invention.

TABLE 1

| Refrigerant Composition | Temperatures (°C.) at 100 psia | | |
|---|---|---|---|
| | Bubble Point | Dew Point | Delta T |
| HFC-125 + HFC-134a (50 + 50) | 15.6 | 19.8 | 4.2 |
| HCFC-22 + HFC-142b (50 + 50) | 23.3 | 33.8 | 10.5 |
| FC-116 + HFC-23 (54 + 46) | −46.4 | −46.4 | 0.0 |
| FC-116 + HFC-23 (40 + 60) | −46.3 | −45.5 | 0.8 |
| FC-116 + HFC-23 (50 + 50) | −46.5 | −46.4 | 0.1 |
| FC-116 + HFC-23 (60 + 40) | −46.4 | −46.1 | 0.3 |
| FC-116 + HFC-23 (65 + 35) | −46.3 | −45.4 | 0.9 |

| Refrigerant Composition | Temperatures (°C.) at 14.7 psia | | |
|---|---|---|---|
| | Dew Point | Bubble Point | Delta T |
| FC-116 + HFC-23 (69 + 31) | −86.0 | −86.8 | 0.8 |
| FC-116 + HFC-23 (44 + 56) | −85.9 | −86.8 | 0.9 |
| FC-116 + HFC-23 (54 + 46) | −86.7 | −86.9 | 0.2 |

EXAMPLE 4

A study compares the refrigeration properties of an azeotropic composition of the invention with Refrigerant-503, which is 40.1 weight percent R-23 and 59.9 weight percent R-13, and perfluoroethane (FC-116). The refrigeration capacity is based on a compressor with a fixed displacement of 3.5 cubic feet per minute. The data are based on a refrigeration cycle with a suction line heat exchanger.

TABLE 2

COMPARISON OF REFRIGERATION PERFORMANCES

| | Refrig. | FC-116 | FC-116/HFC-23 (wt percents) | | |
|---|---|---|---|---|---|
| | 503 | | (58/42) | (54/46) | (50/50) |
| Evaporator Temp, °F. | −80.0 | −80.0 | −80.0 | −80.0 | −80.0 |
| Evaporator Pres, psia | 54.4 | 32.0 | 52.8 | 52.6 | 52.0 |

TABLE 2-continued

COMPARISON OF REFRIGERATION PERFORMANCES

|  | Refrig. 503 | FC-116 | FC-116/HFC-23 (wt percents) | | |
|---|---|---|---|---|---|
|  |  |  | (58/42) | (54/46) | (50/50) |
| Condenser Temp, °F. | −10.0 | −10.0 | −10.0 | −10.0 | −10.0 |
| Condenser Pres, psia | 218.0 | 138.3 | 213.4 | 214.0 | 213.7 |
| Return Gas Temp, °F. | −60.0 | −60.0 | −60.0 | −60.0 | −60.0 |
| Compressor Discharge, °F. | 51.8 | 7.2 | 33.1 | 35.9 | 38.8 |
| Coefficient of Performance | 3.8 | 3.6 | 3.7 | 3.7 | 3.7 |
| Capacity Btu/min | 204 | 113 | 187.9 | 190 | 191.3 |

Capacity is intended to mean the change in enthalpy of the refrigerant in the evaporator per pound of refrigerant circulated, i.e., the heat removed by the refrigerant in the evaporator per time.

Coefficient of performance (COP) is intended to mean the ratio of the capacity to the compressor work. It is a measure of refrigerant energy efficiency.

For a refrigeration cycle typified by the above conditions, both the COP and capacity increase by adding HFC-23 to FC-116. These results show that a composition of FC-116 and HFC-23 improves the capacity and energy efficiency of a refrigeration cycle when compared to FC-116 alone.

FC-116 AND NITROUS OXIDE

EXAMPLE 5

A phase study was made on perfluoroethane and nitrous oxide, wherein the composition was varied and the vapor pressures measured, at a constant temperature of −45.55° C. An azeotropic composition was obtained as evidenced by the maximum vapor pressure observed and was identified as follows:

Perfluoroethane=44.8 weight percent

Nitrous oxide=55.2 weight percent

Vapor pressure=123.31 (850.2 kPa) at −45.55° C.

EXAMPLE 6

A second phase study on perfluoroethane and nitrous oxide discloses the following azeotropic composition:

Perfluoroethane=45.3 weight percent

Nitrous oxide=54.7 weight percent

Vapor pressure=100 psia at −51.2° C.

EXAMPLE 7

A study as in Example 3 of dew point temperatures and bubble point confirms the azeotropic or azeotrope-like behavior of compositions of FC-116 and $N_2O$.

TABLE 3

| Refrigerant Composition | Temperatures (°C.) at 100 psia | | |
|---|---|---|---|
|  | Bubble Point | Dew Point | Delta T |
| HFC-125 + HFC-134a (50 + 50) | 15.6 | 19.8 | 4.2 |

TABLE 3-continued

| Refrigerant Composition | Temperatures (°C.) at 100 psia | | |
|---|---|---|---|
|  | Bubble Point | Dew Point | Delta T |
| HCFC-22 + HCFC-142b (50 + 50) | 23.3 | 33.8 | 10.5 |
| FC-116 + $N_2O$ (35 + 65) | −51.1 | −50.8 | 0.3 |
| FC-116 + $N_2O$ (40 + 60) | −51.2 | −51.0 | 0.2 |
| FC-116 + $N_2O$ (50 + 50) | −51.2 | −51.0 | 0.2 |
| FC-116 + $N_2O$ (55 + 45) | −51.1 | −50.6 | 0.5 |

EXAMPLE 8

A study as in Example 4 compares the refrigeration properties of an azeotropic composition of the invention with Refrigerant-503 and perfluoroethane (FC-116).

TABLE 4

COMPARISON OF REFRIGERATION PERFORMANCES

|  | Refrig. 503 | FC-116 | FC-116/$N_2O$ (wt. percents) (45/55) |
|---|---|---|---|
| Evaporator Temp, °F. | −80.0 | −80.0 | −80.0 |
| Evaporator Pres, psia | 54.4 | 32.0 | 65.2 |
| Condenser Temp, °F. | −10.0 | −10.0 | −10.0 |
| Condenser Pres, psia | 218.0 | 138.3 | 257.0 |
| Return Gas Temp, °F. | −60.0 | −60.0 | −60.0 |
| Compressor Discharge, °F. | 51.8 | 7.2 | 58.6 |
| Coefficient of Performance | 3.8 | 3.6 | 3.9 |
| Capacity Btu/min | 204 | 113 | 252 |

For a refrigeration cycle typified by the above conditions, the capacity and the COP of FC-116 is increased by adding $N_2O$ to the FC-116. These results show that a composition of FC-116 and $N_2O$ improves the capacity of a refrigeration cycle when compared to Refrigerant 503.

FC-116 AND CARBON DIOXIDE

EXAMPLE 9

A phase study was made on perfluoroethane and carbon dioxide, wherein the composition was varied and the vapor pressure measured, at a constant temperature of −45.55° C. An azeotropic composition was obtained as evidenced by the maximum vapor pressure observed and was identified as follows:

Perfluoroethane=47.9 weight percent

Carbon dioxide=52.1 weight percent

Vapor pressure=138.1 psia (952.2 kPa) at −45.55° C.

EXAMPLE 10

A second phase study on perfluoroethane and carbon dioxide discloses the following azeotropic composition:

Perfluoroethane=51.4 weight percent

Carbon dioxide=48.6 weight percent

Vapor pressure=100 psia at −52.2° C.

EXAMPLE 11

A study as in Example 3 shows that novel azeotropic or azeotrope-like compositions of FC-116 and $CO_2$ exhibit dew and bubble points with virtually no temperature differentials.

TABLE 5

| Refrigerant Composition | Temperatures (°C.) at 100 psia | | |
|---|---|---|---|
| | Bubble Point | Dew Point | Delta T |
| HFC-125 + HFC-134a (50 + 50) | 15.6 | 19.8 | 4.2 |
| HCFC-22 + HFC-142b (50 + 50) | 23.3 | 33.8 | 10.5 |
| FC-116 + $CO_2$ (45 + 55) | −52.2 | −52.0 | 0.2 |
| FC-116 + $CO_2$ (50 + 50) | −52.2 | −52.2 | 0.0 |
| FC-116 + $CO_2$ (60 + 40) | −52.2 | −51.6 | 0.6 |

EXAMPLE 12

A study as in Example 4 compares the refrigerant properties of the azeotropic compositions of the invention with Refrigerant-503 and perfluoroethane (FC-116).

TABLE 6

| | Refrig. 503 | FC-116 | FC-116/$CO_2$ (wt. percents) (50/50) |
|---|---|---|---|
| Evaporator Temp, °F. | −80.0 | −80.0 | −80.0 |
| Evaporator Pres, psia | 54.4 | 32.0 | 61.6 |
| Condenser Temp, °F. | −10.0 | −10.0 | −10.0 |
| Condenser Pres, psia | 218.0 | 138.3 | 312.0 |
| Return Gas Temp, °F. | −60.0 | −60.0 | −60.0 |
| Compressor Discharge, °F. | 51.8 | 7.2 | 74.4 |
| Coefficient of Performance | 3.8 | 3.6 | 3.2 |
| Capacity Btu/min | 204 | 113 | 236 |

For a refrigeration cycle typified by the above conditions, the capacity increases by adding $CO_2$ to FC-116. These results show that a composition of FC116 and $CO_2$ improves the capacity of a refrigeration cycle when compared to FC116 alone and to Refrigerant 503.

FC-116 AND HFC-41

EXAMPLE 13

A phase study was made on perfluoroethane and fluoromethane, wherein the composition was varied and the vapor pressures measured at a constant temperature of −45.55° C. An azeotropic composition was obtained as evidenced by the maximum vapor pressure observed and was identified as follows:

Perfluoroethane=80.2 weight percent
Fluoromethane=19.8 weight percent
Vapor pressure=108.21 psia (746.1 kPa) at −45.55° C.

EXAMPLE 14

A second phase study on perfluoroethane and fluoromethane discloses the following azeotropic composition:

Perfluoroethane=80.3 weight percent
Fluoroethane=19.7 weight percent
Vapor pressure=100 psia at −47.6° C.

EXAMPLE 15

A study as in Example 3 shows that novel azeotropic or azeotrope-like compositions of FC-116 and HFC-41 exhibit dew and bubble point temperatures with small temperature differentials.

TABLE 7

| Refrigerant Composition | Temperatures (°C.) at 100 psia | | |
|---|---|---|---|
| | Bubble Point | Dew Point | Delta T |
| HFC-125 + HFC-134a (50 + 50) | 15.6 | 19.8 | 4.2 |
| HCFC-22 + HCFC-142b (50 + 50) | 23.3 | 33.8 | 10.5 |
| FC-116 + HFC-41 (82 + 18) | −47.7 | −47.3 | 0.3 |
| FC-116 + HFC-41 (78 + 22) | −47.7 | −47.1 | 0.6 |
| FC-116 + HFC-41 (80 + 20) | −47.7 | −47.7 | 0.0 |

EXAMPLE 16

A study as in Example 4 compares the refrigeration properties of the azeotropic compositions of the invention with Refrigerant 503 and FC-116.

TABLE 8

| COMPARISON OF REFRIGERATION PERFORMANCES | | | |
|---|---|---|---|
| | Refrig. 503 | FC-116 | FC-116/HFC-41 (wt. percents) (80/20) |
| Evaporator Temp, °F. | −80.0 | −80.0 | −80.0 |
| Evaporator Pres, psia | 54.4 | 32.0 | 53.7 |
| Condenser Temp, °F. | −10.0 | −10.0 | −10.0 |
| Condenser Pres, psia | 218.0 | 138.3 | 221.0 |
| Return Gas Temp, °F. | −60.0 | −60.0 | −60.0 |
| Compressor Discharge, °F. | 51.8 | 7.2 | 36.0 |
| Coefficient of Performance | 3.8 | 3.6 | 3.5 |
| Capacity Btu/min | 204 | 113 | 184 |

For a refrigeration cycle typified by the above conditions, the capacity increases by adding HFC-41 to FC-1 16. These results show that a composition of FC-116 and HFC-41 increases the capacity of a refrigeration cycle versus FC-116 alone.

The novel azeotrope or azeotrope-like compositions of FC-116 and HFC-23 or FC-116 and $N_2O$ or FC-116 and $CO_2$ or FC-116 and HFC-41 may be used to produce refrigeration by condensing the compositions and thereafter evaporating the condensate in the vicinity of the body to be cooled.

The novel azeotrope or azeotrope-like compositions may also be used to produce heat by condensing the refrigerant in the vicinity of the body to be heated and thereafter evaporating the refrigerant.

The use of azeotropic or azeotrope-like compositions eliminates the problem of component fractionation and handling in systems operations, because these compositions behave essentially as a single substance. Several of the novel azeotrope-like compositions also offer the advantage of being essentially nonflammable.

In addition to refrigeration applications, the novel constant boiling compositions of the invention are also useful as aerosol propellants, heat transfer media, gaseous dielectrics, fire extinguishing agents, expansion agents for polyolefins and polyurethanes and as power cycle working fluids.

Additives such as lubricants, corrosion inhibitors, stabilizers, dyes, and other appropriate materials may be added to the novel compositions of the invention for a variety of purposes provided they do not have an adverse influence on the composition, for their intended applications.

We claim:

1. A process for producing refrigeration in refrigeration equipment comprising condensing a mixture consisting of an azeotropic or azeotrope-like composition consisting of about 40 to 65 weight percent perfluoroethane and about 35 to 60 weight percent trifluoromethane, said composition boiling at about −46° C. at a pressure of about 100 psia and wherein the difference in bubble point and dew point at 100 psia is from 0° to 0.9° C., and thereafter evaporating said composition in the vicinity of the body to be cooled.

2. The process of claim 1, wherein said azeotropic or azeotrope-like composition is 50 to 58 weight percent perfluoroethane and 42 to 50 weight percent trifluoromethane.

3. The process of claim 1, wherein said azeotropic or azeotrope-like composition is 54 weight percent perfluoroethane and 46 weight percent trifluoromethane.

* * * * *